Jan. 10, 1967 J. C. HOIBY ETAL 3,296,997

EXHAUST AND MUFFLING SYSTEM FOR MARINE ENGINES

Filed June 22, 1965

INVENTORS
JAMES C. HOIBY
JOSEPH D. MENTH

BY Carlsen, Carlsen & Sturm

ATTORNEY.

United States Patent Office 3,296,997
Patented Jan. 10, 1967

3,296,997
EXHAUST AND MUFFLING SYSTEM
FOR MARINE ENGINES
James C. Hoiby, Minnetonka, and Joseph D. Menth,
Fridley, Minn., assignors to Studebaker Corporation,
South Bend, Ind., a corporation of Michigan
Filed June 22, 1965, Ser. No. 465,946
4 Claims. (Cl. 115—.5)

This invention relates generally to appartus for carrying off exhaust gases from marine engines disposed below the surrounding water level.

Internal combustion engines used in marine craft are commonly cooled by intake and discharge of water in which the craft is operating. The water after cooling the engine or engine coolant heat exchanger is normally piped into the exhaust manifold to cool the combustion gasses so that the gasses might be carried in a suitable conduit through the hull to be discharged. The mixing of the coolant water with the exhaust gases cools the exhaust so that the discharge pipe will not present a fire hazard. In installations where the engine is disposed above the water line the exhaust pipe is merely angled downwardly to the boat hull for discharge therethrough, the downward angle prohibiting any runback of water to the engine.

In certain installations, however, it is desirable or necessary to mount the engine in the boat at a position below the water line. Where such an arrangement is used the exhaust is carried through a pipe upwardly from the manifold for discharge above the water line. Obviously the coolant water cannot be dumped into such a pipe to produce the desirable cooling effect as it would drain back to the engine. It has accordingly been found necessary to provide a water jacket around such an exhaust pipe or stack to keep the pipe from reaching an excessive and dangerous temperature within the hull. At the same time it is necessary to provide some positive means for discharging the engine coolant.

Water jacketing of the exhaust line is not only expensive but necessitates rigid mountings between the exhaust discharge means and the boat structure so that engine vibrations are transmitted to the hull. This, of course, detracts from the smoothness and silence of the boat operation.

One object of the present invention is to provide an exhaust system for marine engines which enables the engine coolant water to be dumped into the exhaust gas line to cool the line even where the engine is disposed below the level of the water in which the boat is afloat.

Another object of the invention is to provide an exhaust system for a marine engine which utilizes the engine coolant liquid to muffle the exhaust noises.

Another object of the invention is to provide an exhaust system for a marine engine disposed at or below the water line of the boat in which the engine is mounted which utilizes the kinetic energy of the exhaust gases to carry the engine coolant liquid upwardly for discharge from the boat above said water line.

Still another object of the invention is to provide an exhaust system for a marine engine disposed below the water line of the boat in which the engine is mounted necessitating carrying the exhaust gases upwardly through a pipe or flexible line for discharge, which system provides a means for cooling the line while yet allowing the engine to be resiliently mounted so as not to transmit vibrations therefrom to the boat.

Still another object of the invention is to provide a system and apparatus for muffling the exhaust gases of a marine engine which automatically adjusts itself to engine speeds to afford maximum silencing during all conditions of operation.

With these objects in view the invention broadly comprises an engine having a gas exhaust line and a water coolant line discharging into the exhaust line, a muffler drum beside the engine, the exhaust line angling downwardly and having a connection with the upper portion of the drum to discharge thereinto, a tubular stack extending upwardly from the drum and having its lower end portion projecting downwardly into the drum with its lower open end spaced above the drum bottom but below said connection whereby as the pressure of the exhaust gases build up within the drum they will entrain a portion of the water lying in the drum bottom and pass upwardly therewith through the stack.

The invention in more complete form is characterized by providing resilient mountings for the engine or drum, or both, utilizing a flexible exhaust line extending therebetween and providing a second flexible line to extend downwardly from the upper end of the stack to a discharge opening in the hull carrying said gas and coolant to the atmosphere.

The above mentioned and still additional objects of the invention will be brought to light during the course of the following specifications, reference being made to the accompanying drawings, in which.

Figure 1:
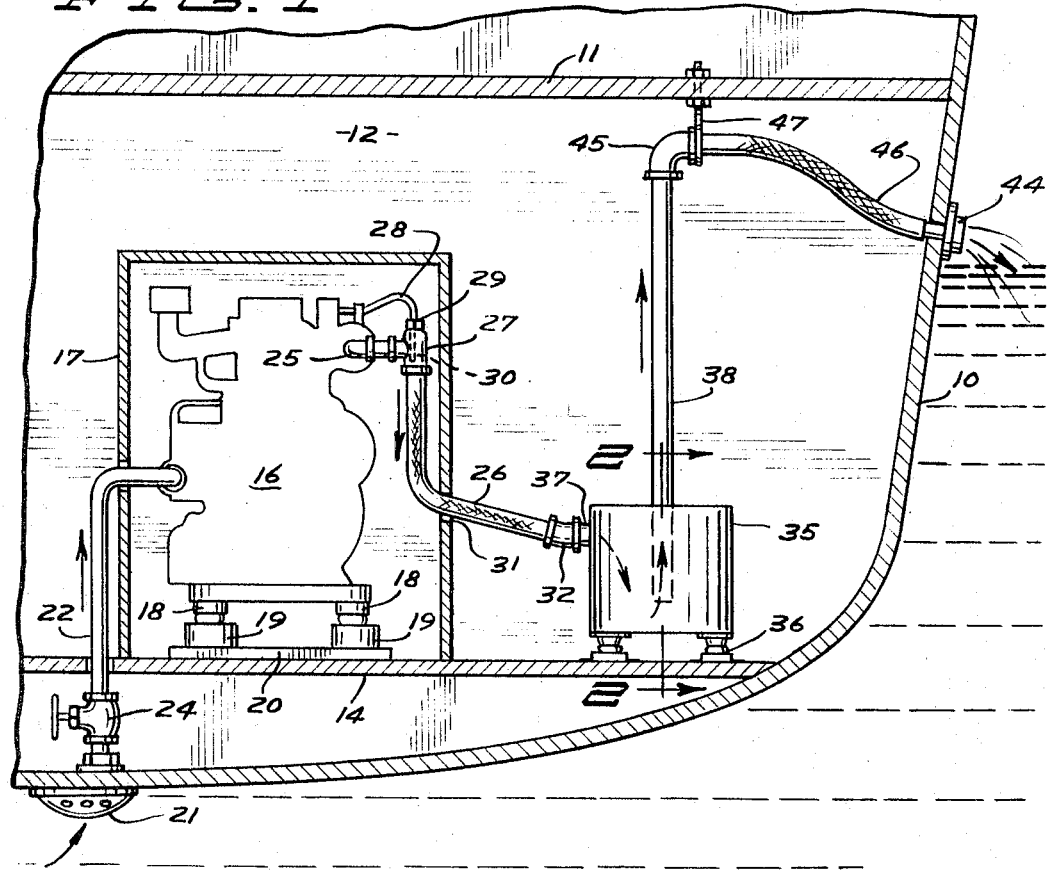
FIG. 1 is a vertical section through a boat hull showing the exhaust and muffling system in elevation.

Referring now more particularly to the drawing, reference numerals will be used to denote like parts or structural features in the different views. The numeral 10 denotes generally a portion of a ship's hull in section with a horizontal deck 11 defining a hold or chamber 12 therebelow within the hull. A base flooring 14 is mounted to extend over the bottom of the hull.

The number 16 denotes generally an electric power generator which may be enclosed within a housing such as denoted at 17. The generator has pedestal feet 18 which are mounted on vibration dampers 19 which in turn are mounted on a base 20 which is secured to the floor 14. The housing 17 when used, as shown, is spaced from the generator at all points a sufficient distance to allow free vibration of the generator without contact between the two.

Generator 16 has a water cooled internal combustion engine. The coolant water is drawn from the body thereof surrounding the hull 10, such as through a strainer 21 and intake line 22 which is provided with a sea cock 24 for closing the line. The engine is also provided with an exhaust manifold for receiving the combustion gases and which connects with an exhaust line 25. Line 25 connects with a flexible line 26 through an elbow 27 which has one branch thereof extending downwardly, as shown in FIG. 1. The coolant water discharge line from the engine is denoted at 28. This line is connected to elbow 27 as by coupling 29 and extends downwardly into the elbow as at 30 to a point below line 25 to dump the used water from the engine into the line 26. It will be noted that line 26 angles downwardly through an opening 31 in the housing 17 to a connector 32.

The muffler drum is designated at 35. It is a cylindrical enclosure supported by optional vibration dampers 36 on the floor 14 with the drum axis upright. An inlet connector 37 connected to coupling 32 opens into the drum near the top thereof. A tubular outlet stack 38 extends vertically and axially through the top of the drum having its lower end portion depending downwardly into the drum to a point substantially below the inlet connector 37. The lower end of the stack is open as at 40 with the opening spaced above the drum bottom as shown.

An outlet port 44 is mounted in the hull above the water line and is connected to the upper end of stack 38 by an elbow 45 and flexible tubing 46. A hanger bracket 47 may be used to suspend the inner end portion of the tubing 46 from the deck 11. It will be observed that port 44 is disposed below the upper end of stack 38 so that line 46 angles downwardly from the elbow 45 to the port.

Figure 2:
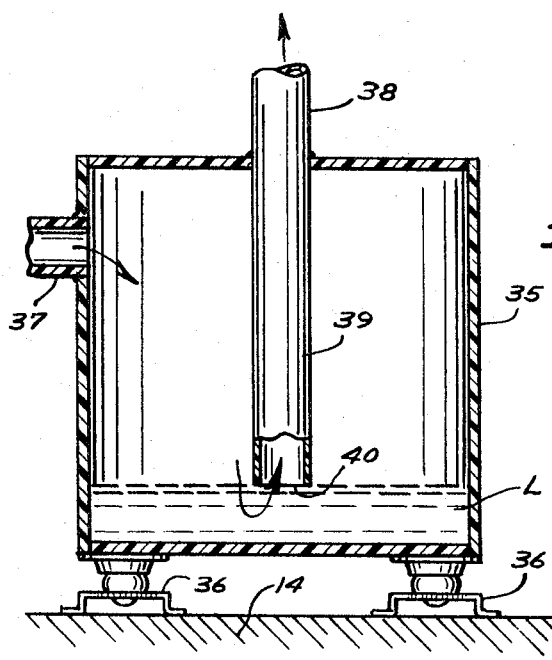
FIG. 2 is a vertical section through the muffler drum with the lower end of the stack partially broken away to show the fluid entrance thereto.

In operation of the generator water will be drawn through strainer 21 and line 22 by a suitable water pump into the generator engine or engine coolant heat exchanger to cool the engine. The coolant water after performing its function will be dumped through line 28, 30 into the line 26 which is also carrying the combustion gases discharging from the engine through the exhaust manifold, line 25 and elbow 27. The water mixing with the gases in line 26 will cool the gases and keep the line from overheating. The liquid-gas mixture then passes downwardly through inlet 37 and into the drum 35 with the liquids L settling to the bottom thereof as shown in FIG. 2.

Due to the volume of the muffler drum and the corresponding decrease in the exhaust gas velocity, the gas having been cooled by the water is again separated from the water as the latter collects in the bottom of the drum. As the liquid level L rises a slight increase in pressure of the gas thereabove forms a head sufficient to force and hold the liquid level just below the open end 40 of the stack 38. This slight pressure differential between the interior of the drum 35 and the interior of the stack 38 allows the exhaust gas to escape in a continuous high velocity flow upwardly through the stack and out the line 46 and port 44 to the atmosphere. The liquid L accumulating in the bottom of the drum will also seek to rise into the tube end 40 and the kinetic energy of the gases escaping through the opening 40 will partially atomize the liquid and entrain the atomized liquid particles to carry them upwardly through the stack 38 without any appreciable increase in exhaust back pressure in drum 35 and line 26.

While the flow of gas serves to entrain and carry the liquid upwardly for discharge above the water line, the liquid serves to muffle the sound of the gas discharge. It is also significant that the water level in the drum will automatically vary with the exhaust discharge of the engine. When, for example, the engine is at low or idle speed the water level will rise to nearly close the opening 40 decreasing the annular gap between the liquid level and discharge opening 40 to give maximum attenuation or silencing of the exhaust noise. When the engine is operated at full throttle, the pressure will lower the water level to increase or expand the gap under the opening 40 providing additional space for higher flow.

Thus the gap between the water level and opening 40 provides a variable orifice automatically adjusting with various throttle conditions to impose a constantly low and reasonably uniform back pressure in the drum and excellent silencing under all engine speeds.

The liquid coolant discharging from the engine will normally exceed one percent of the gas volume at all engine speeds and in such amount has sufficient cooling effect on the line 26, drum 35, stack 38 and line 46 to eliminate any fire hazard. It is also significant that with the line 26 extending downwardly from the elbow 27 there is no possibility of liquid backup to the engine.

The resilient mounting of the generator 16 (optional for the drum 35), along with the flexible hoses or fluid lines 22, 26, 28 and 46, minimizes transmission of the engine and muffler vibrations to the hull 10.

The exhaust and muffler system described accordingly economically and effectively carries out the aforementioned objectives. While the system may be used in above water installations it is particularly advantageous where the marine engine is disposed below the water line. Perhaps the most significant novel result of the construction is that it allows discharge of both the exhaust gases and coolant liquid from a below water engine through the same conduit system. In doing so it utilizes the liquid both as a coolant and muffling medium and at the same time utilizes the kinetic energy of the gases to move the liquid upwardly for discharge above the water line of the boat.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In an exhaust system for an internal combustion engine mounted within the hull of a marine craft so as to be disposed below the water line when the craft is afloat, an exhaust line adapted to be connected to the engine for carrying off combustion gases, a liquid line for connection to the engine for carrying off engine coolant liquid, a muffler drum having a bottom and adapted to be disposed beside the engine and below the water line, a fluid discharge line having a singular internal passageway and having one end connected to said exhaust line and said liquid line to receive and intermix in said passageway fluids therefrom and then extending away and downwardly from the engine and having its other end connected to the drum to be in open communication therewith to discharge said intermixed fluids into the drum so that the liquids fall upon the bottom thereof, an upright imperforate walled stack on the drum extending downwardly into the drum and having its lower open end disposed within the drum below said other end of the fluid discharge line spaced relation to the drum bottom and its upper end disposed above the water line, conduit means connected to the upper end of the stack and extending through the hull above the water line, and the space within the drum between connection of the fluid discharge line to the drum and the lower open end of the stack being unencumbered whereby as the liquid on the bottom rises toward said lower open end of the stack a pressure differential will be set up between the drum interior and the stack interior so that the kinetic energy of the combustion gases will carry portions of the liquid upwardly through the stack and out the conduit means.

2. The subject matter of claim 1 wherein said fluid discharge line and said conduit means are flexible so as to absorb vibrations.

3. In an exhaust system for an internal combustion engine having a gas exhaust line and a line for carrying engine coolant liquid, a muffler drum for disposition beside the engine, the exhaust line having an extension angling downwardly for connection with the drum to provide an enclosed passageway from the line to the drum, said liquid line being connected to said extension to discharge liquid into said passageway to mix with the exhaust gas therein, a tubular stack extending outwardly from the upper portion of the drum and having its lower imperforate walled end portion projecting downwardly into the drum with its lower open end disposed in spaced relation above the drum bottom but below the exhaust line connection to the drum whereby the kinetic energy of the gases entering the drum will carry the coolant liquid from the drum bottom upwardly through the stack for discharge, said exhaust line extending horizontally and then downwardly from the engine, and said liquid line opening into the downwardly extending portion thereof.

4. In an exhaust system for an internal combustion engine having a gas exhaust line and a line for carrying engine coolant liquid, a muffler drum for disposition beside the engine, the exhaust line having an extension angling downwardly for connection with the drum to provide an enclosed passageway from the line to the drum, said liquid line being connected to said extension to discharge liquid into said passageway to mix with the exhaust gas therein, a tubular stack extending outwardly from the upper portion of the drum and having its lower imperforate walled end portion projecting downwardly into the drum with its lower open end disposed in spaced relation above the drum bottom but below the exhaust line connection to the drum whereby the kinetic energy of the gases entering the drum will carry the coolant liquid from the drum bottom upwardly through the stack for discharge, the engine being resiliently mounted within a rigid enclosure, said exhaust line extension being of a relatively flexible material whereby the engine vibrations are not transmitted to the drum, and a flexible line connecting the upper end of the stack to a wall of the enclosure so that vibrations are not transmitted to the enclosure.

References Cited by the Examiner

UNITED STATES PATENTS

| | | | |
|---|---|---|---|
| 1,938,849 | 12/1933 | Maxim et al. | 181—52 |
| 2,204,294 | 6/1940 | Blanchard | 60—31 |
| 2,360,429 | 10/1944 | Leadbetter | 181—52 |
| 2,511,713 | 6/1950 | Hoyle et al. | 181—52 |

MILTON BUCHLER, *Primary Examiner.*

ANDREW H. FARRELL, *Examiner.*